United States Patent
Gross et al.

(10) Patent No.: US 8,869,564 B2
(45) Date of Patent: Oct. 28, 2014

(54) METHOD FOR TEMPERATURE MANIPULATION OF A MELT

(75) Inventors: Andreas Gross, Gustavsburg (DE);
Hildegard Roemer, Floersheim (DE);
Norbert Greulich-Hickmann, Mainz (DE); Guido Raeke, Pfaffen-Schwabenheim (DE); Guenter Weidmann, Flonheim (DE); Thomas Stelle, Mainz (DE); Volker Ohmstede, Bingen (DE); Wolfgang Jost, Mainz (DE)

(73) Assignee: Schott AG (DE)

( * ) Notice: Subject to any disclaimer, the term of this patent is extended or adjusted under 35 U.S.C. 154(b) by 1618 days.

(21) Appl. No.: 12/161,502

(22) PCT Filed: Jan. 22, 2007

(86) PCT No.: PCT/EP2007/000509
§ 371 (c)(1),
(2), (4) Date: May 10, 2010

(87) PCT Pub. No.: WO2007/085398
PCT Pub. Date: Aug. 2, 2007

(65) Prior Publication Data
US 2010/0218558 A1  Sep. 2, 2010

(30) Foreign Application Priority Data

Jan. 24, 2006  (DE) .......................... 10 2006 003 535

(51) Int. Cl.
*C03B 5/027* (2006.01)
*C03B 5/44* (2006.01)
(Continued)

(52) U.S. Cl.
CPC . *C03B 5/44* (2013.01); *C03B 5/225* (2013.01); *C03B 5/185* (2013.01); *F27D 11/10* (2013.01);
(Continued)

(58) Field of Classification Search
CPC .. C03B 2211/70; C03B 2211/71; H05B 3/03; F27D 1/12

USPC ............................ 65/335–345, 347, 355–356
See application file for complete search history.

(56) References Cited

U.S. PATENT DOCUMENTS 2,636,914 A * 4/1953 Arbeit ............................ 373/31
3,359,090 A * 12/1967 Hynd .............................. 65/178
(Continued)

FOREIGN PATENT DOCUMENTS

BE        894 795 A      2/1983
DE        19939780 A1    2/2001
(Continued)

OTHER PUBLICATIONS

"Korean Office Action for Korean International Application No. 10-2008-7020302 dated Jan. 3, 2011", Publisher: The Korean Intellectual Property Office, Published in: Korea.

(Continued)

*Primary Examiner* — Jodi C Franklin
(74) *Attorney, Agent, or Firm* — Kaplan Breyer Schwarz & Ottesen, LLP

(57) ABSTRACT

For permitting temperature manipulation of a melt even at a conductivity below $10^{-1}\ \Omega^{-1}\ cm^{-1}$ and thus permitting refining of the melt at temperatures about 1700° C., the invention provides a method and a device for temperature manipulation of a melt (16), in particular in a refiner unit. The melt (16) is heated at least by ohmic resistance heating with at least two electrodes (4) that are arranged in the melt (16). At least a part of the melt (16) is cooled. The device (1) for temperature manipulation, refining, purification and homogenisation of a melt (16) comprises at least one arrangement for accommodating melt material (36, 16), defining an inner chamber, and at least two electrodes (4) for ohmic resistance heating of the melt (16). The electrodes (4) project into the inner chamber of the arrangement, in particular of a vessel (2).

17 Claims, 10 Drawing Sheets

(51) Int. Cl.
C03B 5/225 (2006.01)
C03B 5/185 (2006.01)
F27D 11/10 (2006.01)
C03B 5/03 (2006.01)
C03B 5/182 (2006.01)

(52) U.S. Cl.
CPC .............. *C03B 5/03* (2013.01); *C03B 2211/70* (2013.01); *C03B 5/182* (2013.01)
USPC .............................. 65/336; 65/374.13; 65/355

(56) References Cited

U.S. PATENT DOCUMENTS

| | | | |
|---|---|---|---|
| 3,391,236 A * | 7/1968 | Blumenfeld | 373/38 |
| 4,246,433 A | 1/1981 | Seifried et al. | |
| 4,638,491 A * | 1/1987 | Perkins | 373/39 |
| 4,900,337 A * | 2/1990 | Zortea et al. | 65/135.8 |
| 5,613,994 A | 3/1997 | Muniz et al. | |
| 5,643,350 A | 7/1997 | Mason et al. | |
| 6,339,610 B1 * | 1/2002 | Hoyer et al. | 373/32 |
| 6,588,234 B1 * | 7/2003 | Kiefer et al. | 65/134.3 |
| 2004/0182113 A1 * | 9/2004 | Tomamoto et al. | 65/135.1 |
| 2005/0028560 A1 * | 2/2005 | Rake et al. | 65/145 |
| 2006/0084561 A1 * | 4/2006 | Horsfall et al. | 501/7 |
| 2006/0137402 A1 * | 6/2006 | Eichholz et al. | 65/347 |
| 2006/0144089 A1 * | 7/2006 | Eichholz et al. | 65/29.21 |

FOREIGN PATENT DOCUMENTS

| | | |
|---|---|---|
| EP | 0 019 007 A1 | 11/1980 |
| EP | 1 055 645 A | 11/2000 |
| EP | 1 484 770 A1 | 12/2004 |
| JP | 2001-89158 A | 4/2001 |
| JP | 2006-516046 A | 6/2006 |
| KR | 10 2005 0095825 A | 10/2005 |
| WO | 2004052054 A1 | 6/2004 |
| WO | 2004/052054 A1 | 7/2004 |

OTHER PUBLICATIONS

Chen, Shengyao, "CN Application No. 200780009470.2 Office Action Aug. 10, 2011", , Publisher: SIPO, Published in: CN.

"Related JP Patent Application No: JP 2008-551706 Office Action", Feb. 14, 2013, Publisher: JPO, Published in: JP.

Fukakusa, Y., "JP Application No. 2008-551706 Office Action Nov. 14, 2011", Publisher: JPO, Published in: JP.

Dr. Potschke, "German Patent Application No. 10 2006 003 535.6-45 Office Action", Oct. 23, 2008, Published in: DE.

Yolaine Cussac, "International Patent Application No. PCT/EP2007/000509 International Preliminary Report on Patentability", Sep. 12, 2008, Publisher: PCT.

\* cited by examiner

Figure 5:
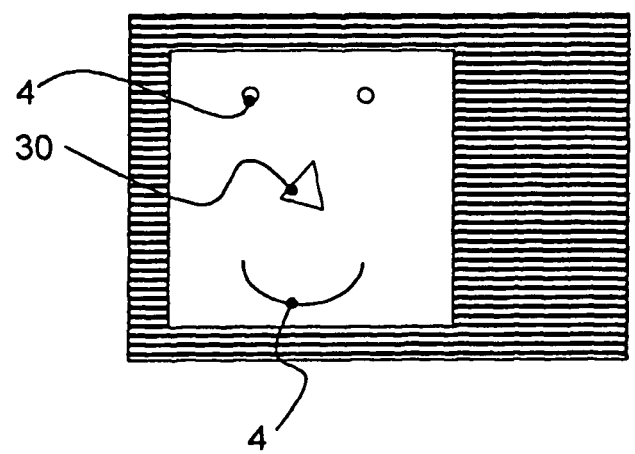

Fig. 5
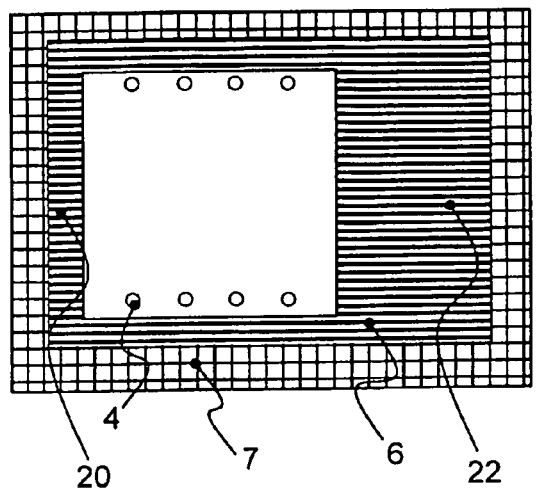
A
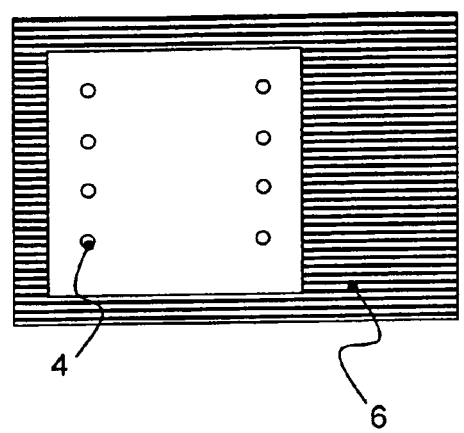
B
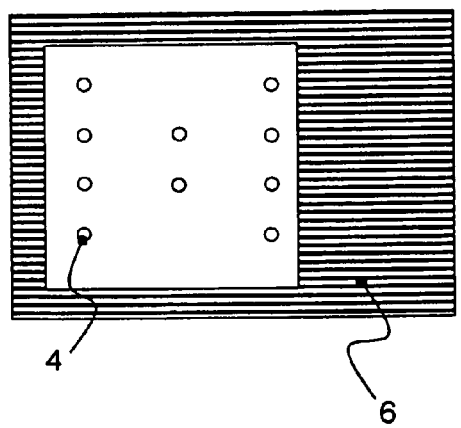
C
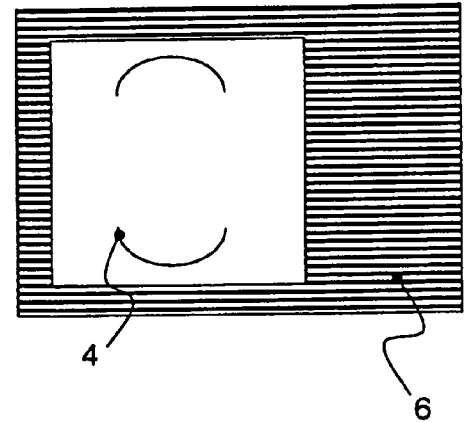
D

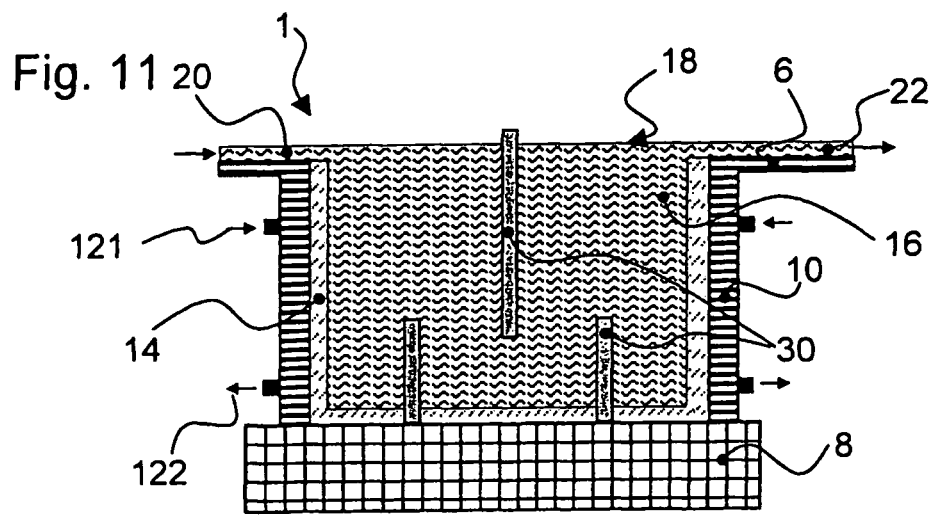
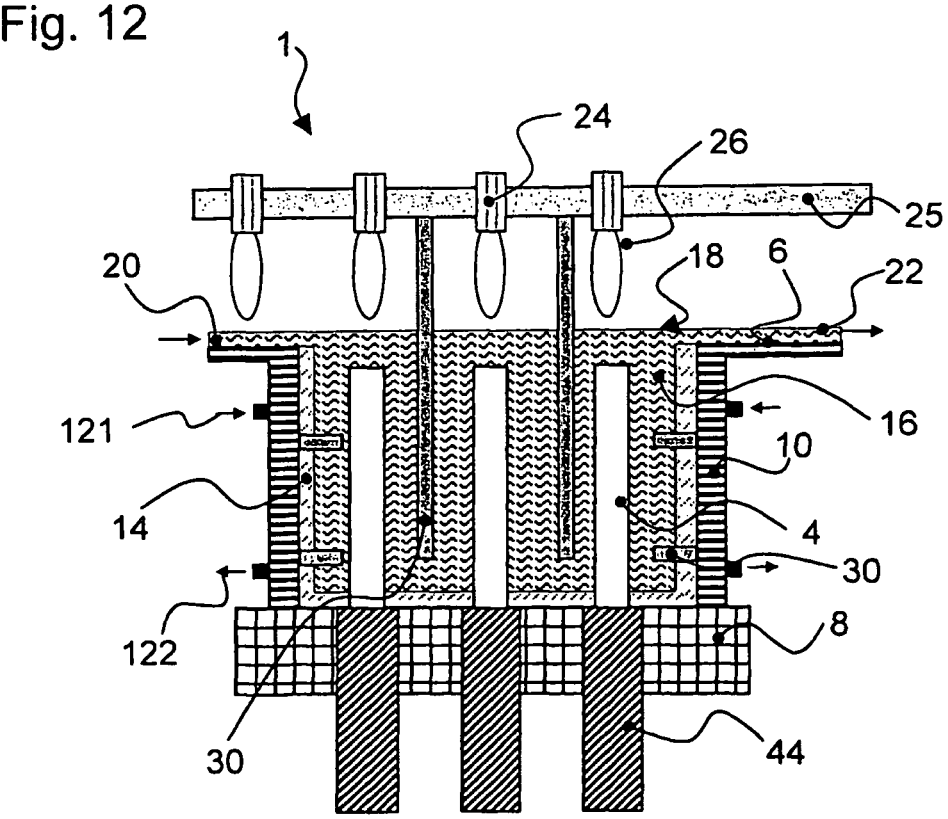

METHOD FOR TEMPERATURE MANIPULATION OF A MELT

The invention relates to a method for temperature manipulation of a melt as well as to a method for refining and/or purifying of a melt. Furthermore, the invention relates to a device for temperature manipulation and/or for refining and/or purifying of a melt as well as to a product, particularly a glass product, which was melted and/or refined and/or purified and/or produced according to the method according to the invention and/or produced in the device according to the invention.

In the first process step in producing glasses, the starting substance, the so-called glass mixture is melted down. Melting down takes place in tanks, and is normally limited to melting temperatures up to 1650° C. due to the thermal capacitance of the wall material. After the mixture has become fluid with increasing temperature, a homogenisation process starts, i.e. a mixing of all starting substances takes place.

After the mixture for generating a glass melt has been heated up, refining normally starts in a second process step. Refining can be performed in a so-called refining chamber. In the refining chamber, the mixture is thoroughly mixed and degassed for improving homogeneity, and for eliminating bubbles. It is an essential goal of refining to release and eliminate gases being physically and chemically bound in the melt.

Features being decisive for the quality of glasses, particularly of display glasses, inter alia are a minimum of bubble inclusions, a minimum of discolouring inclusions, and a minimum of harmful or ecologically questionable substances such as arsenic.

A starting-point for improving the refining of the glass melt and to decrease the necessary refining time is using refining temperatures being as high as possible. Inter alia, the viscosity of the glass melt is decreased, and the ascension velocity of the bubbles in the melt is increased.

Using so-called refining agents is a further starting point. The principle of these refining agents is to add substances to the melted mixture, particularly to the melted glass, which substances disintegrate at high temperatures with outgassing and release of oxygen. The gases being released by the refining agents "pick up" the gases being in the melt. By doing so, bubbles becoming bigger during refinement are generated, which bubble up to the surface of the melt faster, and therefore leave the melt.

Choosing the refining agents firstly acts on the temperature of the glass melt during refinement. When the refining agent arsenic pentoxide $As_2O_5$ already disintegrates into $As_2O_3$ and oxygen at temperatures above 1250° C., the high temperature refining agent $SnO_2$ disintegrates into SnO and ½O2 at temperatures not lower than 1500° C. The produced oxides remain in the melt, and can be detected in the glass end-product. Arsenic being therein then is disadvantageous, if ecologically unquestionable glasses are wanted. Therefore, there is a need of possibilities for refining at very high temperatures, i.e. at temperatures >1650° C. to perform refining more efficiently. Such an increase of temperature, however, is associated with severe disadvantages, especially by intensified corrosion of the fire-proof linings, in the case of conventional devices, only with severe disadvantages in the case of conventional methods.

Conventionally, heating the glass melt takes places by means of oil or gas burners, which are placed in the superstructure region of furnace. When doing so, heat is introduces via the surface of the glass pool. Particularly with lowly absorbing glasses, an additional electrical heating by means of electrodes takes place as additional heating. For doing so, the glass melt is conductively heated by alternating current, i.e. it is directly heated using the Joule effect. For this purpose, the electrodes are attached at the bottom or at the side walls of the vessel, and are in direct contact with the glass melt.

Primarily, molybdenum, platinum, and metals from the platinum group are used as electrode material. In case of conventional operations or in known devices, however, these materials also are exposed to possible corrosion. Molybdenum electrodes very strongly tend to oxidation. Therefore, they have to be protected by an inert gas atmosphere during the start process. Likewise, compounds in the melt such as $As_2O_5$ may corrode molybdenum or even platinum electrodes. In comparison to electrodes made from molybdenum, platinum electrodes are substantially more inert, but may be used for longer periods of time at temperatures up to 1500° C., only.

In the document U.S. Pat. No. 4,246,433, using cooled, particularly water-cooled rod electrodes is described, which are inserted into a melting vessel through the side walls. By the water-cooling, the stability of the electrode against corrosion at higher temperatures is still ensured. Therefore, higher temperatures may be adjusted in the melt with out having to accept breaking or deformation of the electrodes. Therefore, by the cooling, the maximally achievable melting temperature is no longer delimited by the application category temperature of the electrode material.

But by the opportunity to be able to adjust higher refining temperatures, or when refining especially corrosive glasses, an increased disposal of material into the glass melt, and therefore also into the glass end-product, results due to an intensified corrosion of the wall of the device. On the one hand, the platinum being mostly used as wall material is very cost-intensive, on the other hand, aggregates made of platinum or platinum alloys have the disadvantage that due to corrosiveness and friction of the glass melts, they dispense small amounts of Pt or other alloy components of the wall into the melt. Then, they are existent in the glass end-product in ionic form as well as finely divided in elementary form. Depending on concentration and particle size in the glass end-product, this platinum disposal of ionic or elementary metal into the glass melt may lead to an unwanted discolouration and an lowered transmission of electromagnetic radiation.

In the document DE 19939780 A1, the continuous refining of glasses in aggregates is described, in which the melt is heated by means of directly injecting high frequency energy. The aggregate used herewith consists of cooling circuits, which are nearly "invisible" to the high frequency radiation being used for heating the melt. The melt solidifies at these cooled walls and forms a so-called skull layer between the glass melt and the wall material, which layer is able to renew itself. By the skull layer at the mostly water-cooled metal pipes, the tightness of the aggregate is ensured. Beyond this, the corrosion of the vessel wall due to the glass melt is minimized, what causes an essentially lower material disposal into the glass melt.

An advantage for melting with high frequency in such a skull pot is that glass melts can be heated up to temperatures above 1700° C., since due to the skull layer formed by means of the cooling, the temperature resistance of the aggregate wall is no more a delimiting factor. By directly injecting the high frequency into the glass melt, the melt may be cooler in the border area of the melting aggregate than in the middle. Due to the skull layer, highly melting and strongly corrosive glasses can also be melted down and refined.

A further advantage with high frequency melting or melting at high temperatures is the usability of so-called high temperature refining agents. This makes it possible to abstain from polluting and toxic refining agents as $As_2O_5$ or $Sb_sO_5$, as it is described in the document DE 19939771, and to use for example the less critical $SnO_2$ as refining agent instead.

Heating the melt by means of high frequency, however, has the disadvantage that at the melting temperature, the glasses, glass-ceramics, ceramics, or crystals to be melted need to have a sufficiently high electrical conductivity, in order that the energy injected by means of high frequency is greater than the heat quantity carried off to the skull walls. Generally, the electrical conductivity of glass and glass-ceramics melts is defined by the alkali content, and, to a minor degree, by the alkaline earth content of these melts. Though the limit value of the necessary electrical conductivity also depends on a number of technical parameters, it became apparent in practice that the electrical conductivity of the melt should be above $10^{-1} \text{Ù}^{-1}\text{cm}^{-1}$.

From experiments in practice it became apparent that particularly the highly melting glasses, for which the high frequency melting in the skull pot would be especially suited due to the high temperatures, have a too low electrical conductivity, particularly below $10^{-1} \text{Ù}^{-1}\text{cm}^{-1}$. Therefore, a number of important technical glasses cannot be processed by means of the high frequency melting technology.

Besides glasses, which are needed for pharmaceutical packagings and high temperature resilient lamps, glasses such as display glasses, which are coated during the further manufacturing process, also are among the glasses with low electrical conductivity. In the case of display glasses, alkali contents in the glasses are unwanted, since these metals may easy diffuse out of the glasses, and so get into the functional layers of the display. Due to the low or non-existing alkali content, these glasses also have a too low electrical conductivity for being injected by means of the high frequency technology.

In PCT/EP 03/13353, a method and an apparatus for heating melts are described. In this apparatus, a glass melt is thereby heated that a current flows between at least two cooled again electrodes, wherein each of the electrodes replace a part of the wall of the melting vessel. In the described apparatus, the wall of the melting vessel cooled in at least one region. With the described apparatus, however, it is disadvantageous that the electrodes cause a heat loss. For one thing, the start therefore is difficult, because the electrodes are arranged in the lower region. Additionally, especially, when starting the apparatus there are problems due to flashovers. Furthermore, forming a skull layer completely is not possible, because this layer would stop the injection of the electromagnetic energy dispensed by the electrodes, which are provided as part of vessel wall.

Against this background, it is an objective of the present invention to provide a opportunity for temperature manipulation of a melt, in particular for refining and purifying of melts, as well as a product, which was melted and/or refined and/or purified and/or produced according to the invention, and when doing so, to avoid the above mentioned disadvantages as far as possible, and to enable a facilitated start of the procedure for treating the melt.

Particularly, a opportunity shall be provided, on the one hand to sufficiently cool the walls of the vessel in order to prevent chemical corrosion of the walls due to the melt, and on the other hand to supply at least more energy than it is lost through the cooled walls.

Furthermore, the invention shall make possible to be able to melt, refine and purify glasses, crystallisation-sensible glasses, glass ceramics, crystals, ceramics, and glasses containing a high amount of zircon, wherein the melts also may have conductivities above $10^{-1} \text{Ù}^{-1}\text{cm}^{-1}$.

The objective covers the goal to enable refining melts at temperature above 1700° C., and to at least lower using refining agents, and particularly to minimise the amount of refining agents, in order to be able to avoid toxic substances such as $As_2O_5$ as far as possible. In spite of high temperatures, also the disposal of ions out of the melt contact surface of the wall of the apparatus shall be minimised.

Furthermore, it is an objective of the invention to effect the temperature manipulation or the melting respectively and/or the refining and/or the purifying of the melt in such an efficient manner that even in the case of high throughputs, it can operated with a comparably low need for energy.

Furthermore, it is an objective of the invention to improve the melt and/or the refining and/or the purifying effect such that it becomes possible to use raw materials, which have less quality, particularly a low cleanness.

Additionally, the invention shall at least minimise the occurrence of bubbles, streaks, glass inhomogeneities, and temperature inhomogeneities, and shall be cost-effective.

These objectives are solved in a surprisingly easy manner by the illustrative embodiment of the present invention.

The invention provides a method for temperature manipulation of a melt, in particular in a refiner unit, wherein the melt is at least heated by means of ohmic resistance heating, at least two electrodes are arranged in the melt, and at least a part of the melt is cooled.

By arranging the at least two electrodes in the melt, the electromagnetic energy for heating the melt can preferably be injected into the material to be melted in a particularly easy manner. By cooling at least a part of the melt, which part may be located in a border area surrounding the melt treated with the method, it is preferably made possible to lower the temperature there, where the melt comes on contact with meltferous components, so that the danger of corrosion and/or disposal of parts of such components into the melt can be lowered. Particularly in the cooled regions of the melt, a crust of solidified material being characteristic of the melt, a so-called skull layer can be formed, which provides a vessel, in which the melt is treated. Then, the melt preferably is surrounded by characteristic material, in which the danger of contaminations is reduced as far as possible.

Furthermore, the invention provides a method for refining and/or purifying of melts, in particular in a refiner unit, wherein the melt is at least heated by means of ohmic resistance heating, and at least two electrodes are arranged in the melt, and at least a part of the melt is cooled. When doing so, particularly at increased temperature, different method steps may go on in the material to be melted and/or melted. On the one hand, further melting down processes may take place, on the other hand, the refining of the melt may take place, wherein besides gas bubbles, also substances negatively influencing the product properties of the future glass can be removed, i.e. a step of purifying may be superposed to the melting and/or the refining.

The invention further provides to process the method such that the melt is provided in at least one arrangement defining an inner chamber, in particular a vessel, wherein the arrangement is cooled at least sectionally. For example, the arrangement can be cooled by pipes, in particular tube, which are passed through by a coolant. Therefore, the term "arrangement" comprises every assembly, which at least temporarily may accommodate the melt. Particularly, also vessels such as refiner units and/or melting pots belong to these assemblies.

To simplify matters, the term "vessel" is used in the following, which term, however, has not to be understood in the meaning of the arrangement being limited to a assembly of linked up, plane components.

By arranging the electrodes in the inner chamber of the vessel, the cooling surface of the side walls, and therefore the cooling effect is preferably increased, in addition. By doing so, all of the side walls are covered with a skull layer during operations, by what the vessel walls are protected against corrosion by the melt, and the melt itself against material disposal from the vessel wall.

Therefore, especially high temperatures may be realized with the method according to the invention, wherein sufficiently low temperatures can be ensured at the vessel walls, simultaneously. Furthermore, an advantageous convection results from the temperature profile being reached, by what the energy brought into the melt is equally brought into the material to be melted or melted. Therefore, the invention enables an energy-efficient temperature manipulation of a melt.

Therefore, due to the invention, the electrodes are used as active elements within the hot region of the material to be melted. In contrast thereto, the skull is isolated against ground and electrodes. By doing so, the danger of flashovers, particularly when starting, is reduced. Therefore, the parameters of the ohmic resistance heating may be chosen with any danger for the used materials of vessel and electrodes such that also low-ohmic glasses can be treated. Therefore, it becomes possible to also melt or refine or purify glasses, and alike glass ceramics and ceramics, which have a low electrical conductivity. For example, the invention can be used for refining alumosilicate glasses, in particular display glass and lamp glass, as well as for refining borosilicate glass, in particular to be applied for pharmaceutical packagings.

Advantageously, according to the method according to the invention, the electromagnetic energy for heating the melt is especially easy injected into the material to be melted. By doing so, especially high temperatures can be achieved in the melt.

This becomes possible by arranging the at least two electrodes in the inner chamber of the vessel, by what the cooling surface of the side walls, and therefore the cooling effect onto the melt is preferably increased. Through this, all of the side walls are covered with a crust of solidified, characteristic material during operations, by what the vessel walls are protected against corrosion by to the melt, and the melt itself against disposal of material from the vessel wall. By doing so, all the side walls are covered with a crust of solidified, characteristic material.

The skull layer permanently revolving during operations furthermore lowers corrosion of the wall of the aggregate, and reduces the disposal of material into the glass melt, and therefore also into the glass end-product. Because of the skull layer, essentially more cost-effective materials such as copper instead of the expensive, often used platinum can preferably be used as wall material.

Because of the especially high temperature in the inner of the melt and of the low temperatures in the region of the side walls, a flow profile is formed throughout the vessel, which profile preferably enables a homogenous distribution of the energy placed into the melt. Because removing bubbles and/or other unwanted substances is supported at the high temperatures, which can be realized with the invention, and of the optimal flow of the material to be melted through the arrangement by means of the method according to the invention for refining and/or purifying of melts, it is possible furthermore to use considerably lower amounts of refining agents.

Furthermore, high temperature refining agents such as $SnO_2$ can be used. By doing so, using conventional refining agents such as $As_2O_5$ can be reduced. Particularly with respect to ecological glasses, these conventional refining agents are disadvantageous, because their remainders in the end-product may have a toxic effect. Therefore, it is an advantage of the invention to be able to achieve such high temperatures in an energy-efficient manner that high temperature refining agents as tin dioxide may be used, which could not have their full refining effect at the lower temperatures being conventional up to now.

With display glass for example, maximally 50% of the tin dioxide used as refining agent are transformed at temperatures up to 1650° C. When increasing the temperature up to 2000° C., the transformation rate is increased up to 100%. Due to these circumstances, the amounts of tin dioxide can be halved with having the same effect, what in case of this very expensive raw material causes an additional economic effect. Because of low Sn contents, the risk of generating alloys at platinum components decreases.

Preferably, especially high temperatures in the melt can be achieved, if at least one region of the melt is heated up to a temperature, which is above the application category temperature of the melt contact material of at least one of the electrodes. Because, due to the method according to the invention, the flow profile through the vessel is provided in a preferable manner with respect to the equal energy disposal into the material to be melted, also with this mode of operation, a disposal of the electrode material into the melt can be kept such low that disadvantageous effects onto the product can be avoided to a large extent.

This can be improved further by cooling the electrodes. According to the invention, the electrodes are preferably cooled separately controllable and/or adjustable and/or tunable. Therefore, a precise adaptation of the cooling efficiency being required for the particular electrode to the temperature in its surrounding is possible in an easy manner. Furthermore, at least one electrode holder can additionally be cooled. Preferably, this contributes to prevent the electrodes from damage further.

Pursuant to the method according to the invention, it is provided furthermore that the bottom of the vessel is cooled in at least one region. By doing so, also on the bottom region a skull crust is formed, which avoids the corrosion of the bottom or the disposal of bottom material respectively into the material to be melted.

If the bottom is only cooled regionally, regions with different electrical conductivity are generated in the melt, which regions cause a corresponding displacement of the electrical field off these bottom regions upwards. Especially when starting, this is energetically favourable, because by doing so the electromagnetic energy to be carried off is injected in the upper region of the vessel. If the melting down process starts there, the generated melt sinks downwards, and the wanted flow profile through the vessel is stimulated by the starting recirculation. During this phase, arranging the electrodes near to the surface of the material to be melted supports these processes.

According to the invention, the cooling can be effected by conducting a coolant, particularly air and/or water, through at least one electrode and/or at least one electrode holder and/or at least one part of the vessel wall and/or the bottom in an especially easy manner.

In order to preferably be able to particularly surely avoid a flashover between electrodes and side wall, therefore a current change-over, which, besides a damage of the side wall, would cause an inefficient disposal of energy into the melt, the electrodes can be arranged in a selectable distance to the cooled side walls. This is possible in an easy manner by introducing the electrodes into the vessel through the bottom. But it is imaginable also to introduce the electrodes into the vessel through the side walls.

Particularly by arranging the electrodes in the bottom, the entry of the electrodes can be placed in a relatively cold region, where the electrical conductivity of the surrounding melt is correspondingly low so that the electrode is almost electrically isolated against the vessel walls. Preferably, the method according to the invention is therefore carried out such that the electrodes are introduced into the vessel essentially without direct contact to the cooled bounding surfaces of the vessel.

If the electrodes are introduced through the bottom for example, the electrode height in the vessel can be selected such that the first-time igniting of the electrodes is made easier depending on the conductivity of the melt.

In order to optimally heat the material to be melted in the inner of the vessel with respect to the temperature distribution and/or the flow profile, the invention provides that when carrying out the method, at least one electrode is moved into the vessel and/or out of the vessel. By doing so, the position of the electrode in the inner of the vessel is changed, and the positions of the places, at which electromagnetic energy is injected into the material to be melted, are changed. By selecting the speed and the starting points as well as the endpoints of moving the electrodes in and out, further parameter are available for temperature manipulation and/or influencing the flow profile in the inner of the vessel, in an easy manner.

In doing so, it is made use of the awareness that depending on their quantity, form, size, and positioning influence the flow of the material to be melted through the vessel. Furthermore, the distribution of the overall energy injected into the melt can selectively be controlled by selecting these parameters. Particularly when starting, a larger part of the overall injected energy may be carried off in the upper region of the melt, where especially much material not yet melted down accumulates, wherein the position of the electrodes may be adjusted with respect to a homogeneous energy distribution and/or an optimised energy distribution with respect to the flow profile in the vessel, during the further course of carrying out the method. By these advantageous possibilities of verifying, starting is considerably made easier on the one hand, while simultaneously on the other hand, a method is provided, which is favourable with respect to energy efficiency.

The material to be melted can particularly be heated efficiently by heating the melt by means of alternate current, preferably with an alternate current frequency in a frequency range from 5 Hz to 1 MHz, preferably about 1 kHz to about 100 kHz, in particular preferably at about 10 kHz.

Advantageously, the method can be carried out at especially high middle temperatures of the melt. According to the invention, in at least one region, the temperature of the melt is heated up to minimally about 1700° C., preferably up to minimally about 1800° C., in particular preferably up to minimally about 2000° C. Because removing bubbles and/or other unwanted substances is stimulated at the high temperatures, which can be realized with the invention, and due to the optimal flow of the material to be melted, through the arrangement, it is preferably possible to use considerably lower amounts of refining agents. Such high temperature values are advantageous for reducing the bubble concentration in the material to be melted, because aside from increasing the transport speed of the substances to be removed, they cause a reduction of viscosity in the melt, what facilitates the discharge of the substances to be removed.

On the one hand, reactions of the substances to be removed with the electrode material, and therewith the corrosion of the electrode material are reduced by means of the invention. On the other hand, reactions of the substances to be removed are reduced near the electrodes so that the generation of gas bubbles is lowered.

An especially suitable formation of the flow profile in the vessel, and a correspondingly efficient energy efficiency can be achieved by adjusting the temperature difference between the melt in a border region of the vessel and the melt in the middle of the vessel and the to more than about 150 K, preferably to more than about 250 K.

In order to integrate the method according to the invention into conducting conventional methods in an especially easy manner, and in order to develop further this conventional method by doing so, the vessel can be operated in the above described manner according to the invention as part of a continuously operated melting facility. Preferably, material to be melted can continuously be fed into and discharged from the vessel also, when doing so. For example, the material to be melted can preferably be fed into the vessel from a melting pot, and be discharged from the vessel in melted form, preferably. By doing so, directly adding the method according to the invention as one step of the treatment process of the material to be melted down from the raw material to the end-product becomes possible.

A main flow direction of the melt is defined by supplying and discharging the material to be melted into or from the vessel. According to the invention, the current basically flows in the flow direction of the glass melt, preferably perpendicularly to the flow direction of the glass melt, or, however, in any other arbitrary direction.

The electromagnetic energy can especially efficiently be injected for heating the melt, if the heating current between the electrodes essentially flows along this main flow direction, or perpendicularly thereto.

If the heating current flows perpendicularly to the main flows direction of the melt, i.e. a so-called transverse heating is carried out, the melt flows into the vessel in a defined manner. The glass well "rushes" into the vessel. By doing so, the risk of overflow is lower in comparison to an operation mode, with which the heating current flows along the main flow direction of the melt, i.e. a so-called longitudinal heating is carried out. Depending on the particular case of application, the transverse heating may preferably be used, but the longitudinal heating is principally usable also.

For influencing the flow profile of the melt through the vessel, or for manipulating the temperature profile in the melt, the invention preferably offers further possibilities.

In particular, all electrodes can be charged with current of the same amperage. Furthermore, also at least one pair of electrodes may be charged with a current having an amperage, which differs from the value of amperage, with which at least one further pair of electrodes is charged. In an advantageous embodiment, the electrodes may furthermore be connected up such that intersecting heat currents with a phase shift, particularly according to a Scott circuit, are generated.

In an especially easy manner, the melt material can be fed into the vessel and be let out of the vessel through a channel having a free surface. Conducting the method with as few intermediate steps as possible is preferably made possible by feeding the melt material into and letting it out of the vessel through a supply and an outlet in the region of the melting pool surface. In order to preserve the materials particularly in the region of the outlet of the vessel due to the very high temperatures of the melt there, according to the invention it is provided that the outlet region of the vessel is at least partially cooled.

Furthermore, an implementation of the method, being optimised with respect to expenditure of time and energy efficiency is mad possible by controlling and/or adjusting and/or tuning the residence time distribution of the melt and/or the mean residence time of the melt in the vessel. Likewise, the flow profile and/or the mean flow speed of the melt in the vessel can be controlled and/or adjusted and/or tuned. In particular, the volume of the vessel may be dimensioned such that the melt in the vessel has a mean residence time of minimally 1 minute, preferably of minimally about 10 minutes up to a time duration of about 2 hours. According to the invention, an indication for dimensioning the vessel correspondingly has to be seen in providing the vessel with a volume, which is smaller at least by a factor 2, preferably by minimally a factor of 10 than the volume of a melting down pot being connected upflow of the vessel.

In order to provide a further parameter, with which disposing the electromagnetic energy from the electrode into the surrounding material to be melted can be made easier, it is provided according to the invention that at least one electrode is temporarily heated. For doing so, various possibilities are available. For example, the heating-up can take place by heating a fluid, particularly by means of electrical energy, by waste heat, or preferably by fossil fuels.

Concerning the production of especially pure glasses, the method may further be fitted to specific requirements by using an oxidising or deoxidising superstructure furnace atmosphere being chosen in dependence on the mixture of the melt. Preferably, an oxidising and/or deoxidising superstructure furnace atmosphere may therefore be made, in particular by means of a correspondingly oxidising or deoxidising operated burner.

In a preferred manner, the method according to the invention can be conducted such that at the mean melting temperature, the conductivity of the melt is in a range from about $10^{-5}$ to about $10^4$ $\mho^{-1}*cm^{-1}$, preferably from about $10^{-2}$ to about $10^1$ $\mho^{-1}*cm^{-1}$.

With a conductivity in this preferred range, disposing the electromagnetic energy is particularly efficiently possible by means of the invention.

In order to preferably make the starting process easier further, according to the invention it is provided that a starting process is carried out, with which at least one melting path with sufficient electrical conductivity between the electrodes for disposing the electromagnetic energy into the melt is provided in the vessel. For doing so, the electrodes and/or parts of the wall may be heated during the starting process by a heating arrangement so far that their temperature is above the dew point of the superstructure furnace atmosphere. Therefore, disposing substance out of the superstructure furnace atmosphere into the melt may be avoided to a large extend.

For increasing the energy disposal into the melt during the starting process, the invention provides various possibilities. For example, dipping electrodes can be inserted into the vessel during the starting process, and via these electrodes, current can additionally be directed into the melt material. Furthermore, at least one sacrificial electrode can be inserted into the vessel during the starting process, and via these electrodes, current can be directed into the melt material.

For being able to facilitate the starting by providing an initially short melting path with sufficient electrical conductivity between electrodes, the invention preferably provides that before the starting process, the electrodes and/or the dipping electrodes and/or the sacrificial electrodes are moved together to a selectable distance essentially being the minimal length of the current path, and are moved apart during the starting process.

Using sacrificial electrodes and/or dipping electrodes for starting preferably offers the opportunity of being able to avoid a drastic voltage increase for starting. According to the invention, the injection process can be performed at a voltage of about 1000 V, depending on the conductivity of the melt, the geometry of the vessel, particularly the size of the cooling surface, and the electrode geometry.

In a preferable manner, the invention may additionally be refined such that the superstructure furnace region of the vessel is heated separately. Heating the superstructure furnace space may particularly take place by means of burners, in particular gas burners and/or radiation heating and/or microwave heating and/or plasma burners. By separately heating the superstructure furnace region, a temperature gradient in the melt towards its surface and therewith an energy loss out of the melt into the superstructure furnace region may at least be reduced.

For an efficient disposal of the injected energy into the entire melt, and therewith an equal temperature distribution, and therefore a relatively long residence time at the wanted temperature for almost all fluid elements of the melt, is has been proven to be particularly advantageous to generate a convection flow in the melt. In an easy manner, this convection flow may be generated by adjusting a temperature difference of the melt between an inner and an outer region.

In order to be able to purposefully influence the flow through the vessel, particularly the convection flow, it is provided according to the invention that the flow is controlled and/or adjusted and/or tuned on the basis of the current distribution on at least two electrodes.

A simple opportunity for mechanically influencing the flow is provided by using fixtures in the inner of the vessel. Furthermore, the flow can be influenced by controlling the throughput of the melt through the vessel.

In order to optimally perform the method of purifying the melt in the vessel with respect to the particular requirements, preferably, various possibilities of influencing the important operating parameter of residence time distribution are therewith given, which can be influenced, aside of the geometrical design of the vessel, by selecting the suited mean circulatory speed or by the throughput respectively as well as by the temperature distribution, and therewith also by the design of the convection roller. According to the invention, the flow profile, and connected thereto the temperature profile in the vessel, can be influenced in an particularly simple and reliable manner being fitted to the respective requirements.

Preferably, the methods according to the invention can automatically be operated. A opportunity for doing so provides that the adjustment and/or control of the heat power of the electrodes is effected by controlling and/or adjusting and/or tuning the current, which flows through the electrodes. Another opportunity is that the control and/or the adjustment of the heating power of the electrodes is effected by controlling and/or adjusting and/or tuning the expended electrical power. Selecting between the two alternatives may be done depending on the properties of the melt material.

Particularly with glasses, the electrical conductivity grows with increasing temperature. If the injected power is kept constant, the current consumption through the electrodes grows with decreasing electrical resistance, therefore increasing conductivity. When doing so, the risk of damaging the electrode material is given. Therefore, by means of a current control, one may quickly be responsive to current filaments, which in the case of glasses, are extremely disadvantageous for the product properties due to the risk of over-heating.

For removing unwanted substance, in particular gas bubbles, from the melt, at least one high temperature refining agent such as tin dioxide may be added to the melt.

Furthermore, the above mentioned objectives are solved by a device for temperature manipulation and/or for refining and/or purifying of a melt, which device comprises at least one arrangement defining an inner chamber, in particular a vessel, for accommodating melt material, and at least two electrodes for ohmic resistance heating of the melt, wherein the electrodes are arranged such that they protrude into the inner chamber of the arrangement, in particular of the vessel.

The electrode may be inserted in the bottom by means of an electrode holder such that an annular gap is formed between electrode and bed stone.

In this annular gap, a ring made of fire-proof material, which at operating temperature, has a higher resistance than the glass, may be inserted. Additionally, the bottom may be provided with a corresponding cooling so that the flow profile is positively effected as well as the bed stone is protected against corrosion.

For meeting the risk of corrosion of the material of the vessel walls, it is provided that at least one wall of the device is coolable.

For preferably being able to insert the electrodes through the bottom of the vessel, the bottom of the vessel provides at least one recess. This recess may be formed as boring, which may be arranged in a certain distance to this side walls, which distance preferably is greater than or equal to about 15 mm.

Such borings may be formed such that the electrodes can be inserted into the borings together with the coolable electrodes. In order to be able to use the device according to the invention as variably as possible, according to requirements at various locations also, the vessel, which may be formed as skull pot, can be mounted on a supporting frame together with the bottom and the electrode holders.

Preferably, in particular, the device further comprises coolable electrode holders. Furthermore, it may have an arrangement for cooling of at least one electrode holder and/or at least one electrode and/or at least one part of the vessel wall and/or at least one part of the bottom, which arrangement has at least one arrangement for providing a cooled and/or coolable fluid, in particular air and/or water, and at least one arrangement for convey the fluid.

The electrodes may have different geometries and forms. In particular, the electrodes may comprise plate and/or button and/or sphere and/or rod and/or Rogowski electrodes.

Hammer-shaped electrodes may be used also. Thereby, geometry and form of the electrodes influence the efficiency of the energy disposal into the material to be melted. When inserting the electrodes, in particular in the bottom of the vessel, rod electrodes turned out to be particularly preferable, which may be constructed as solid material and/or as cap electrodes. Electrodes with a purposefully enlarged surface, such as plate electrodes or in the form of a hammer, offer the advantage of lowering the stress of the electrode surface due to too high current densities. A corresponding design of the form may add to that, with which design sharp transitions like particularly flanges are avoided. Chamfered outer bonds of the electrodes have turned out to be advantageous.

The arrangement of the electrodes, in particular the distance of the electrode centre to the next adjacent wall, may be selected depending on the conductivity of the melt. By using rod electrodes, an opportunity is provided to keep the side walls totally in skull, whereby the cooling surface of the side walls increases, and therefore the cooling effect to the melt also, whereby the convection may additionally be supported.

By the distance to the particularly cooled electrodes, a flashover between electrode and side wall can be avoided. It is a further advantage the entry point of the electrode into the vessel is in a relatively cool region, and is therefore accordingly electrically insulated. The arrangement of the electrodes, according to the invention furthermore implicates the advantage that no cooled components being connected with the cooled pot walls protrude into the superstructure furnace region. By doing so, corrosion of components due to the sulphur compounds being in the superstructure furnace atmosphere can preferably be avoided.

Concerning the possible field of application of a material as electrode in the device according to the invention, it is decisive that at the operating temperature of the device, the material does not react with the melt. According to the invention, the electrodes may have a melting contact material, which comprises metals as osmium, hafnium, molybdenum, tungsten, iridium, tantalum, platinum, platinum metals, and/or their alloys. Thereby, iridium is of special importance as active electrode material.

In this context, the term "active" element refers to the multiple function, which is performed by the electrode. Besides the heating, also the flow of the melt is effected by the electrode, as it acts as a kind of drive mechanism for the convection flow in the vessel. Besides the water-cooled skull, which effects a downward flow of the melt in the vessel, the electrodes are a part of the so-called convection motor. By the heat source, also referred to as source thermae, around the electrode an upward flow of the melt in the vessel is formed. On the one, the electrode therefore has the function of heating, and on the other the function of a convection drive, and is therefore referred to as "active" element.

The combination of skull pot and electrode, according to the invention prevents the pot from overflowing due to the advantageous shape of the flow profile of the melt through the vessel. By using iridium, very high operating temperatures of above 2000° C. may thereby achieved.

Besides electrodes, in particular metal electrodes, made of solid material, it is also possible according to the invention to use electrodes, which only have a layer of the respective material. For doing so, the electrode may comprise a core, preferably a ceramics core. Preferably, it is furthermore provided that at least one electrode is provided with a layer, which particularly comprises osmium, hafnium, molybdenum, tungsten, iridium, tantalum, platinum, platinum metals and/or alloys thereof. According to the invention, also layers with each suited material are possible to be used in the device.

For being able to vary form and geometry of the electrodes in a large extend, the invention provides that at least one electrode comprises at least two electrode segments. For this purpose, at least one section of the electrode is understood with the term "segment", which section has a certain outer form and/or a certain inner setup. According to the invention, the electrodes may be composed of different segments, but be produced as single pieces also, wherein the material made in one piece has different regions of different outer form and/or different inner setup, and therefore is segmented also in the meaning according to the invention.

In order to be able to flexibly react on changed requirements concerning the electrodes to be used and/or on damages of the electrodes in an easy manner, it is furthermore provided according to the invention that at least one electrode is replaceably mounted at the device.

Special advantages, particularly concerning starting the device, may be realized by attaching at least one electrode to the device, being movable, particularly in vertical direction. Then, the electrode height, as measured from the bottom of the vessel, selected such that for example, igniting the electrodes for the first time is made easier in dependence on the conductivity of the melt.

By the variable, in particular replaceable mounting of the electrodes in the material of the bottom, particularly the skull bottom, of the vessel, the opportunity furthermore is provided to modularly build the bottom from elements, which have an arrangement for accepting an electrode, and from simple bottom elements with out such an arrangement. The wanted electrodes may movably inserted into the elements, which have an arrangement for accepting an electrode.

From the two kinds of elements for the bottom of the vessel, different arrangements may be put into practice, which enable positioning the electrodes at the places being required for the optimal forming of the flow, in particular of the convection roller in the inner of the vessel. So, the electrodes may be arranged in a row for example, but in their function as flow breaking fixtures, also be positioned in the inner of the vessel.

By choosing the electrode material, for example a ceramics, dimension and speed of the convection roller can be defined by means of purposefully adjusting a current filament. By additional movability of the electrodes, the opportunities for their positioning may be enlarged advantageously. So, it is provided according to the invention that at least one electrode is attached rotatably.

For lowering the thermal stress of the electrodes, and to achieve especially high melting temperatures by doing so, at least one electrode may be coolable. For that purpose, one electrode may comprise at least one channel for conveying a fluid.

The arrangement of the electrodes may be side by side in a row. Depending on the requirements concerning the appearing flow profile, the invention provides different possibilities for arranging the electrodes. For example, the electrodes can be arranged in to rows side by side parallelly. But it is also possible to arrange the electrodes side by side in two rows that they are perpendicularly facing each other.

In a further preferred embodiment, The electrodes may be arranged in the lower part of the vessel, preferably below the level, at which the surface of the melt is in the operating mode, in the region of the two lower thirds of the filling level of the vessel. In doing so, the device may have several pairs of electrodes and/or several pairs of electrode segments.

The electrodes may also be arranged such that the electrodes act as flow breaking fixtures on the flowing melt. According to the invention, an assembly may be achieved by arranging the electrodes, with which assembly the electrodes preferably have no direct contact with the for example water-cooled walls of the vessel, and in ranges, where the electrodes still have a temperature above 1600° C., the distance between electrode and metallic components is minimally 1 cm, preferably more than 2 cm. In doing so, the electrodes may be provided with an inner cooling, but also be operated not being cooled.

The walls of the device according to the invention may flexibly be constructed depending on the requirements. The vessel may comprise skull walls and/or ceramics walls. Preferably, the vessel has skull walls, which preferably comprise metallic pipes, which are lined with a badly electrically conducting material, preferably in the form of ceramics plates or slip, particularly $SiO_2$ slip, on the side facing the melt.

For example, the bottom of the vessel may consist of fusion casted fire-proof material as zirconium silicate, which still assures a considerably higher resistance than the melt at the high operating temperatures. By arranging cooling pipes transversely to the electrodes, the bottom may be protected against corrosion and unregulated current flow.

In a preferred embodiment, the vessel of the device according to the invention may have a cooled bottom as well as cooled side walls, of which two side walls facing each other form the supply and the outlet. The vessel may be constructed as skull pot. In doing so, the skull walls may be constructed such that in built-in condition, they are angled outside about an angle, by what a collar is formed. Such a collar may be produced especially easy, if the angle is about 90° for all skull walls. Then, the side walls are therefore angled L-shaped.

While with known devices, there is the disadvantage that the electrodes are arranged below the seam of the vessel, and the starting energy has therefore to be guided into deeper layers of the glass, so that the skull pot is heavily used, namely thermally as well as by high electrical voltages, the invention provides the opportunity that the electrodes may be arranged flushly with the top edge of the skull collar. This effects a considerably lower energy need when disposing, and a lower impact onto the vessel. Since according to the invention all side walls have to be cooled down to the bottom, the risk of over-flow is noticeably lower.

Compared to each other, supply and outlet of the vessel may be constructed asymmetrically, i.e. the collar may be formed asymmetrically. On the side of the supply, the part being angled from the side wall may be formed relatively short, because here, the incoming material still has no high temperature. After the material has flown over this short region of the supply, it abruptly falls into the vessel, where also by the appearing convection roller, which operates independently from a certain temperature, it is conveyed through the vessel.

On the side of the outlet, the material to melted down is conveyed upwards at the side wall, where it arrives with very high temperature. In order not to damage components adjoining the device according to the invention, the part being angled from the side wall in the region of the outlet has a relatively high length. The outlet may particularly take the function of a cooling section. Corresponding to the prevailing temperatures, the L-shape of the side walls may also be formed accordingly in the side region of the vessel. In particular, the side walls may be made from L-shaped, water-cooled skull segments for example consisting of copper tube with optional diameter, in particular for facilitating the construction of the side walls, of square-cut copper tubes.

The side walls and, as already described above, the elements, the cooled bottom of the vessel is built-on, enable a modular design of the device according to the invention, in which flow-influencing fixtures, particularly for influencing the convection roller, may be arranged. According to the invention, also the walls of the vessel may therefore comprise at least two sub-units. By doing so, the size of the vessel may be fitted to flexible requirements in an easy manner.

The sub-units of the walls may electrically be separated from each other. Preferably, insulting separation walls between the sub-units, preferably mica washers, may be brought in-between. The side walls and the bottom of the vessel may be connected with each other in a leak proof manner by means of a mechanical fixing, particularly a twisting. In doing so, separating elements, in particular mica washers form an insulation of the skull elements.

The insulating separation elements, which may be provided as mica washers for example, are arranged between each two adjacent skull segments, i.e., so to speak, around each skull segment. Therewith, the insulating separation elements are longitudinal as well as transverse to the flow flow direction. Preferably, it is avoided therewith that the electrical current may flow over the walls of the skull pot unopposedly.

In order to implement the ohmic resistance heating in the device according to the invention, it is provided that an arrangement for generating alternate current is made available, which current has an alternate current frequency in the range from 5 Hz to 1 Mhz, preferably with an alternate current frequency in the range from about 1 kHz to about 100 kHz, in particular preferably with an alternate current frequency of about 10 kHz.

According to the invention, materials, which come into contact with the material to be melted down, are selected such that they are chemically particularly resistant against the material to be melted down and its melt. This likewise applies for electrodes and/or the walls of the vessel. Preferably, the vessel comprises copper. As material for the vessel, iridium, rhodium, or molybdenum are considered for example.

The device according to the invention has a vessel with a geometry, which allows ratio between volume and surface, being as small as possible in order to avoid energy losses over the surface to a large extend. In modifying the base of a cube, such a geometry may be achieved, in particular the vessel may have a multiangular, particularly a rectangular, particularly a quadratic or round, particularly an oval, particularly a circular layout.

It has became apparent that the actively used volume per daily throughput is an important parameter concerning the efficient energy efficiency. Depending on the requirements concerning for example the refining process, if a large amount of gas shall be removed out of the material to be melted, it may also be advantageous to chose the surface-to-volume ratio of the vessel as large as possible for offering the gas bubbles a large escape surface. This may be done thus that especially with the advantageous modular design of the vessel, the height of the vessel is accordingly fitted with the size of the bottom area being unchanged.

For minimising energy losses to the environment of the vessel, the invention additionally provides that the device has an arrangement for additional heating. The additional heating may comprise at least a radiation heating and/or a microwave heating and/or a plasma burner heating.

Furthermore, at least one of the electrodes may comprise a heating arrangement.

The device at least comprises one supply region and at least one outlet region. For protecting against the very high temperatures especially in the outlet region, the outlet region of the device may at least partially comprise a ceramics layer. Furthermore, the outlet may preferably be formed as cooling section.

The bottom of the vessel comprises at least fire-proof material, particularly a fire-proof material with an electrical conductivity of preferably below of or equal to $1/30 \ \mho^{-1}*cm^{-1}$ at 1600° C.

For example, the fire-proof material comprises zirconium dioxide. The bottom of the vessel may furthermore have a cooling arrangement, which comprises at least a pipe being coolable with a fluid, in particular water, which pipe is angularly directed to a flow direction in the melt, in particular about an angle of 90°, and which touches the bottom of the vessel.

For making available, besides providing and positioning, a further possibility of influencing the flow profile through the vessel, the invention furthermore provides that the device comprises fixtures, which are suitable for influencing the flow of the melt through the vessel.

Furthermore, the device may comprise at least one injector for injecting a gas, particularly for injecting $N_2$ and/or He and/or Ar. Depending on the application, other gases may also be selected. Advantageously, a so-called "bubbling" may be effected by using such gases. That offers the opportunity to influence the convection flow of the melt in the vessel. In particular, the convection flow may be intensified. Furthermore, influence may be exerted on the temperature distribution in the melt by means of the bubbling.

The device according to the invention, may particularly be used as part of a larger facility. If a certain amount of melt is provided in such a facility, of which amount only a part shall be processed such that the advantages of the invention can be implemented, the invention furthermore provides that a flow diving direction is provided for dividing a melt flow into at least two branch flows so that at least one device according to the invention may be arranged in one of the branch flows, and the other branch flow can be further processed in another manner. The device can be used as refining and/or purifying and/or melting module, which may be placed upflow a following unit, particularly a homogenisation unit and/or a forming unit.

Likewise, the device according to the invention can be used as refining and/or purifying and/or melting module and/or homogenisation module, which is placed upflow a overflow-downdraw-unit. This becomes possible thus that the present invention enables the production of a melt being homogeneous to an extremely high degree, which melt is particularly suited for being used as base material for producing, for example, display glasses in an overflow-downdraw-method.

Furthermore, the invention may be used as refining and/or purifying module, which is integrated into a melting tank, i.e. into a vessel being passed through by melt. For doing so, the melting tank may be formed, for example, as a refining and/or purifying module in one region.

Particularly, this can be implemented by building a so-called bank starting at the bottom of the melting tank. For example, this bank may have cooled walls, which comprise refractory metals (e.g. molybdenum). The device according to the invention can be integrated into the inner region of the bank. Particularly, the device may be connected with the walls forming the bank in the region of its side walls.

The fill level of the melting tank, as seen in flow direction before or after the wall respectively, may be considerably larger than the fill level in the region of the refining and/or purifying module. This may thus achieved that the module is, so to speak, "hooked in" the bank, and the height from the bottom of the module till its upper border is considerably smaller than the distance from the bottom of the melting tank to the upper border of the bank.

Because with such an arrangement the path, which bubbles have to take in the refining and/or purifying module inside the melt for leaving the same, is small in comparison to the corresponding way in the melting tank, the refining effect is considerably improved. Particularly, the high temperature of the melt contributes to that, which temperature, according to the invention, can be achieved in the refining and/or purifying module. For being able to particularly reliable operate the device according to the invention or perform a method according to the invention for temperature manipulation and/or for refining and/or purifying of a melt, it is necessary to provide a suitable control. Therefore, the above mentioned objectives are solved by means of a control method for a facility for temperature manipulation and/or refining and/or purifying of melts, with which control method at least two electrodes are arranged in the inner of a vessel, and the electrical current through the at least two electrodes is used as control variable and/or actuating variable for at least one target variable, in particular the temperature distribution and/ or the flow profile in the vessel. In an advantageous further embodiment, the flow profile in the convection roller can be used as target value.

For solving the objectives, the invention offers a further opportunity by means of a control method for a facility for temperature manipulation and/or for refining and/or purifying of melts, with which at least two electrodes are arranged in the inner of a vessel, and the electrical power carried off by the at least two electrodes is used as control variable and/or actuating variable for at least one target variable, in particular the temperature distribution and/or the flow profile in the vessel. Particularly, the flow profile in the convection roller can be used as target value.

For influencing the flow-/temperature profile, either all electrodes may be charged with the same current or single pairs of electrodes are individually charged. Furthermore, crossing (Scott circuit) current flow directions with a phase shift are possible besides the parallelly (transverse heating) arranged current flow direction. Additionally, all further possibilities of interconnection may be used, also between electrodes being directly adjacent.

Furthermore, it is provided according to the invention, to control the electrodes at least temporarily in a pulsed manner. This opportunity offers the advantage to keep the wanted flow profile by means of purposeful energy pulses, in the case of changing flow parameters for example due to temperature changes of the melt when performing the method. Likewise, by means of pulsed operation when starting, a pulsed higher energy disposal may locally and/or temporarily be superposed to the continuous energy disposal by means of a certain amperage, for providing an opportunity, by which opportunity the wanted flow and/or temperature profile is faster generated than without impressing a superposed pulsed energy disposal.

For solving the above mentioned objectives, the invention furthermore makes a product, in particular a glass product, available, which was produced according to the method according to the invention, and/or melted and/or refined and/or purified and/or produced in the device according to the invention.

For example, such products may be characterized by means of the value of the ratio of the amount of $Sn^{4+}$ to the total amount of Sn, which is the sum of $Sn^{2+}$ and $Sn^{4+}$. At higher temperatures, the ratio is shifted towards $Sn^{2+}$. Due to the high temperature, which may be effected by means of the invention, the value of the ratio of the amount of $Sn^{2+}$ to the amount of Sn is shifted in comparison to methods with conventional temperatures such that at least 25% to at least 40% more of $Sn^{2+}$ is in the mixture.

Because the refining and/or purifying effect is severely improved by the invention, in particular by the very high achievable temperatures, it is possible to use more cost-effective base material, therefore such of lower pureness, since the required quality of the product may still be ensured by the high refining and purifying effect due to the invention. For example, water, sulphur, and halogens are removed out of the melt during the refining or purifying process respectively.

Parameters characterizing raw materials of inferior quality may be a particularly high content of water, a particularly high content of sulphur, a particularly high content of lightly volatile components such as chloride. Concerning the content of iron, it has to be taken into account that Fe contributes to refining, and the ratio of the amounts of $Fe^{3+}$ to $Fe^{2-}$ is shifted towards $Fe^{2+}$. Due to the high process temperatures, one has to face shifts of the quotient $Fe^{2+}/(Fe^{2-}+Fe^{3+})$ by at least 2% up to at least 40%.

The product, in particular the glass product according to the invention may have at least a glass and/or at least a glass ceramics and/or at least a ceramics, which have a low electrical conductivity. In particular, the product may comprise alumosilicate glass, particularly display glass or lamp glass. In particular, the product may comprise borosilicate glass, in particular in the case of an application for pharmaceutical packagings.

Furthermore, the invention relates to aggressive glasses such as tin silicate or lanthanum brat glasses, which can otherwise be melted only very difficultly. Also lead silicate glasses may be handled by means of the invention.

With respect to the products, which can be melted and/or purified and/or refined and/or produced by means of the invention, special advantages result from being especially poor in bubbles.

Because only very low amounts if refining agents are required in total, the residua of refining agents in the product such as the content of tin dioxide are very low, too. Therefore, the product has a content of tin of less than 1.0% by weight, preferably of less than 0.4% per weight, preferably of less than 0.2% per weight, and particularly preferably of less than 0.1% per weight.

Furthermore, the invention enables the production of glasses with a lower content of knots. For example, knots are regions, from which substances like sodium and/or boron evaporate, and by doing so, other rigidity properties are effect. By such knots, particularly problems when tube drawing. Therefore, the invention particularly enables the production of tubes, but also of other glasses, which essentially have no knots.

In the following, the invention is described by means of embodiments referring to the attached drawings. In all figures, the same components are referred to by the same reference signs.

Figure 1:
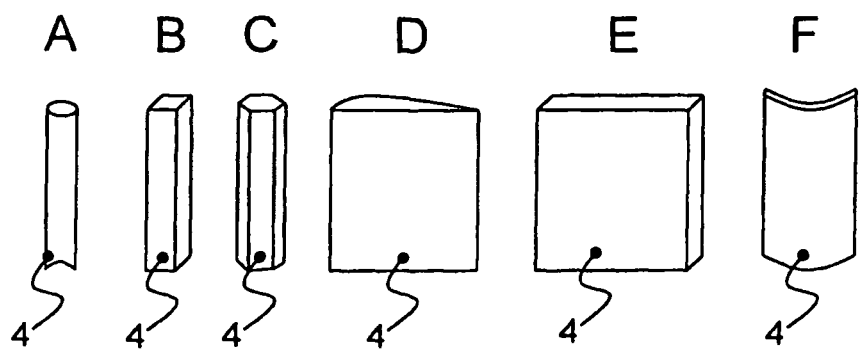
Figure 2:
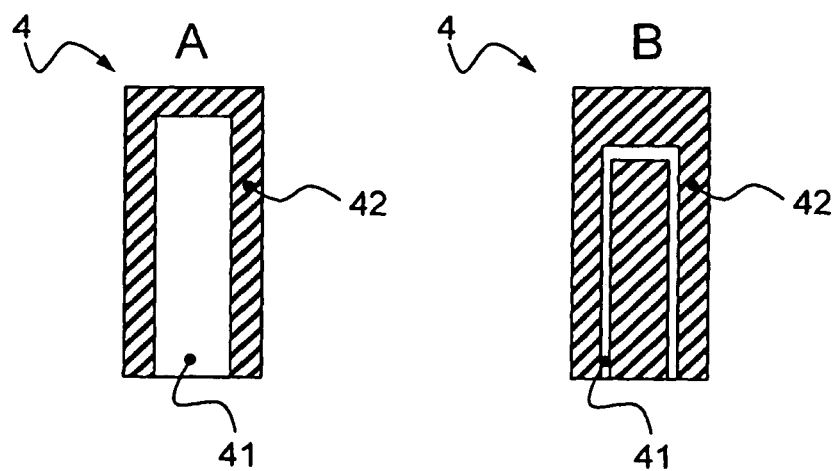
Figure 3:
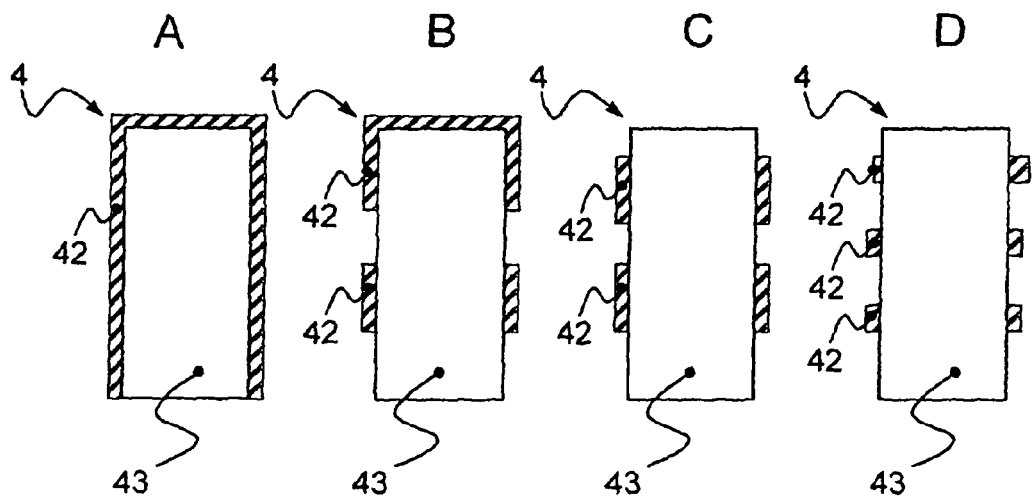
Figure 4:
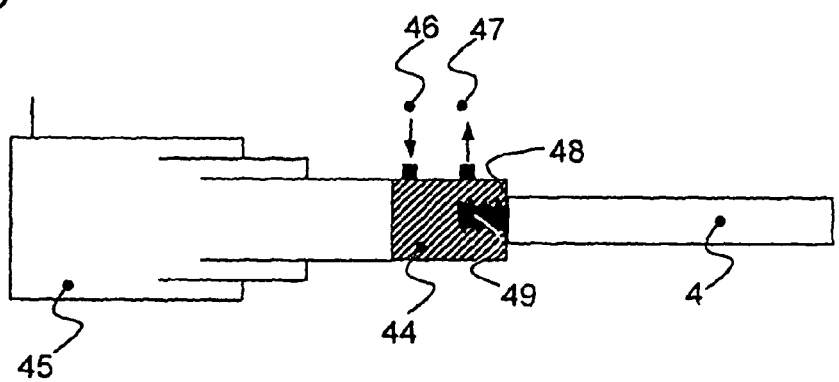
Figure 6:
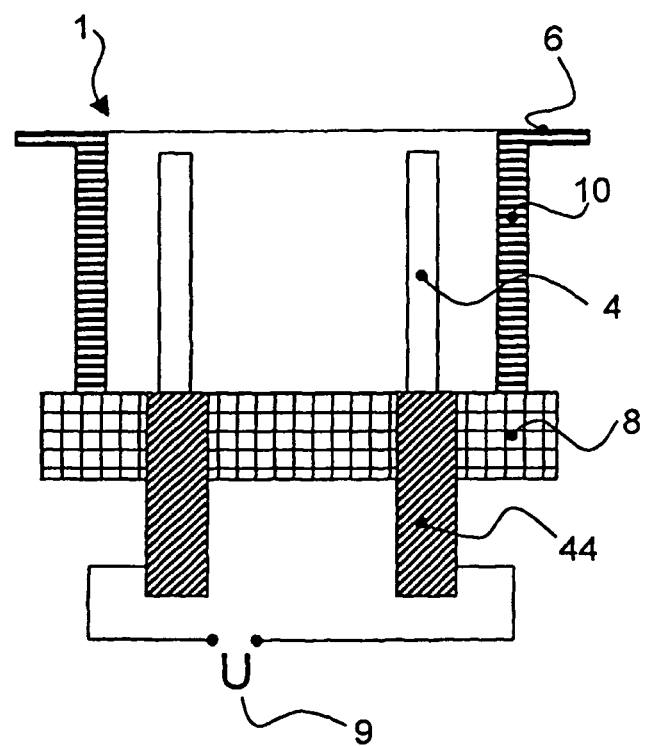
Figure 7:
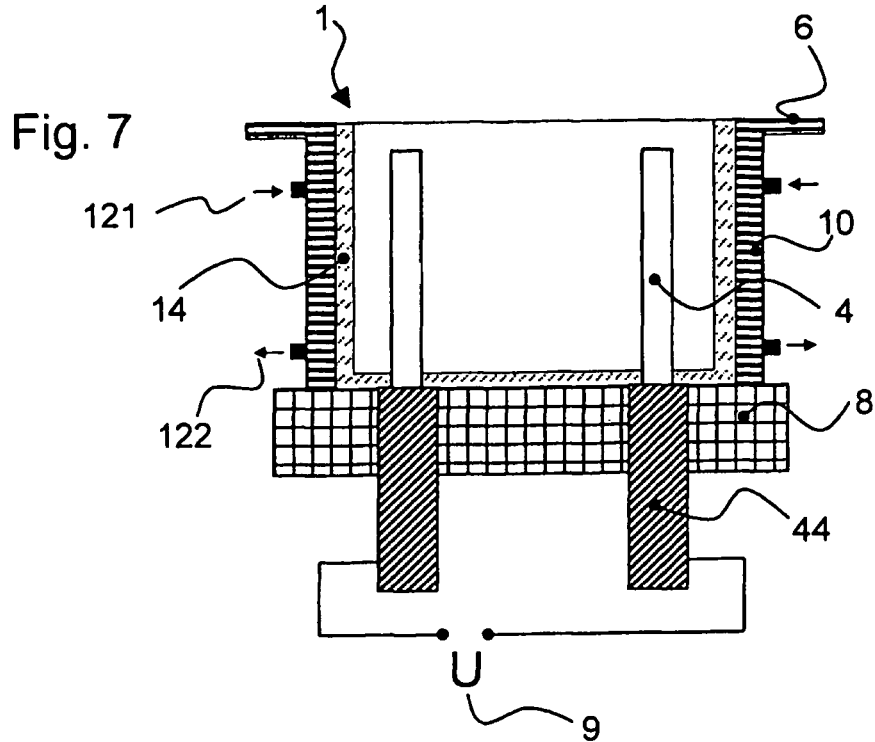
Figure 8:
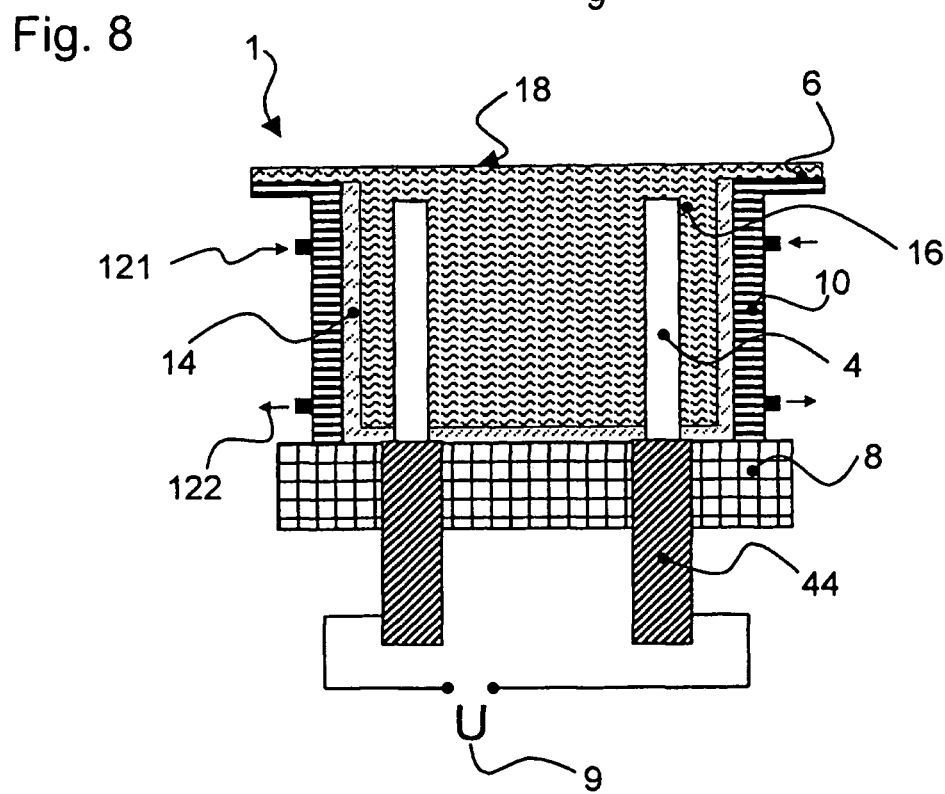
Figure 9:
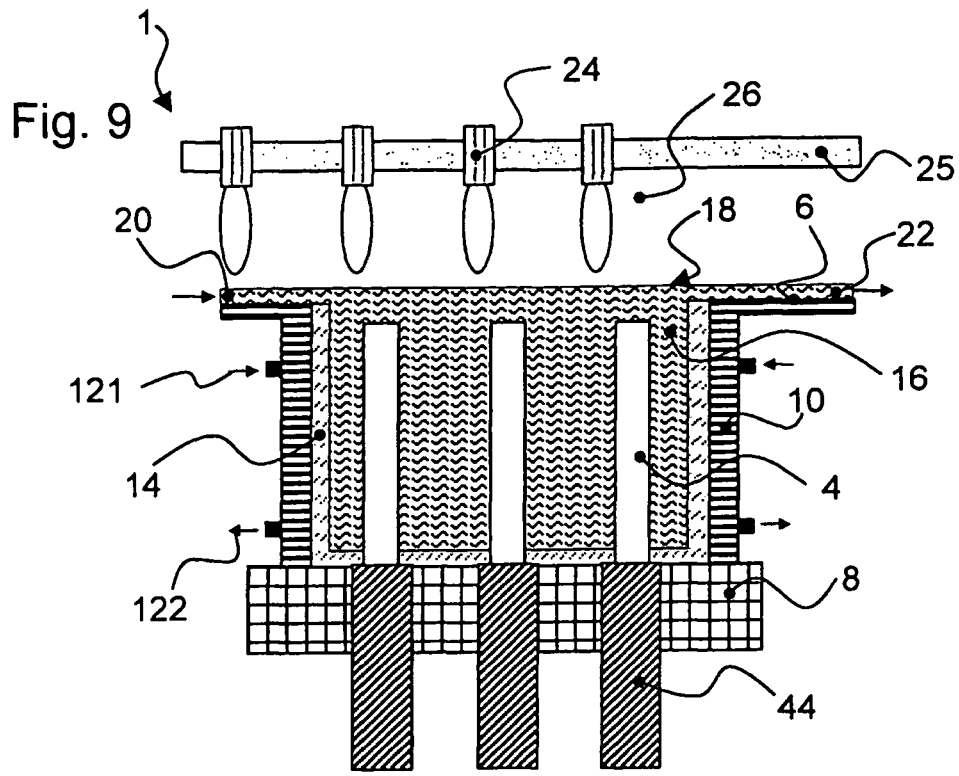
Figure 10:
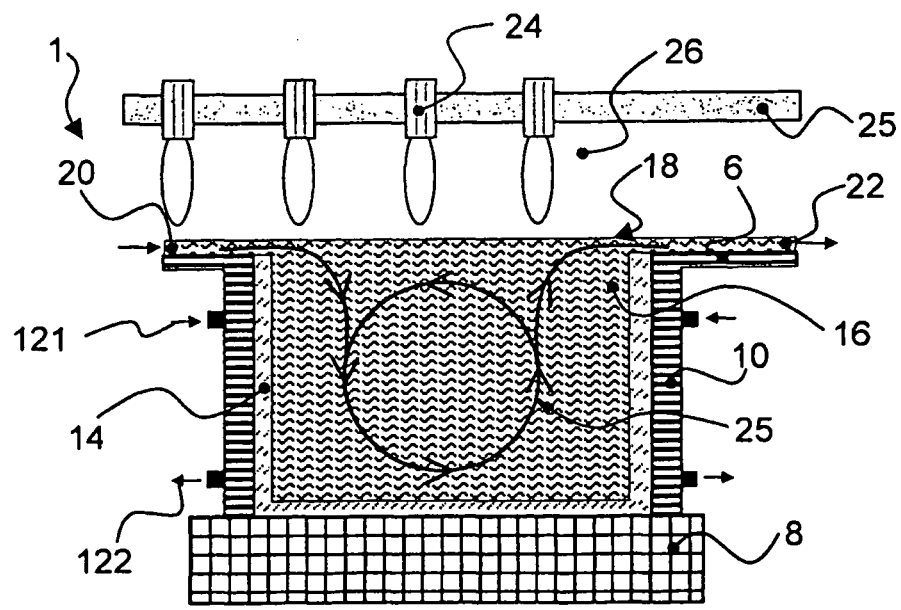
Figure 13:
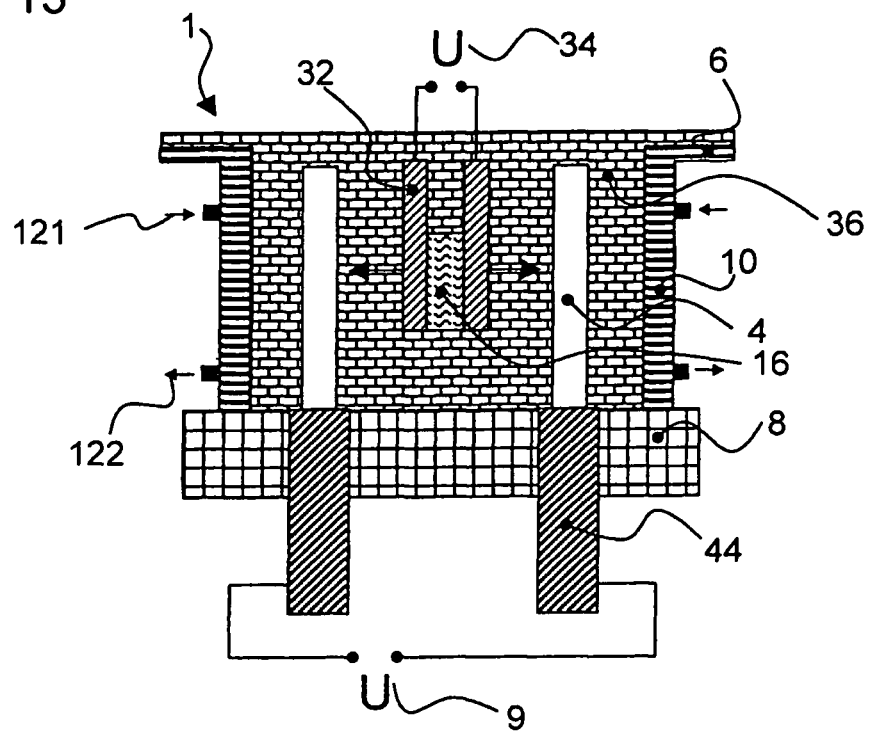
Figure 14:
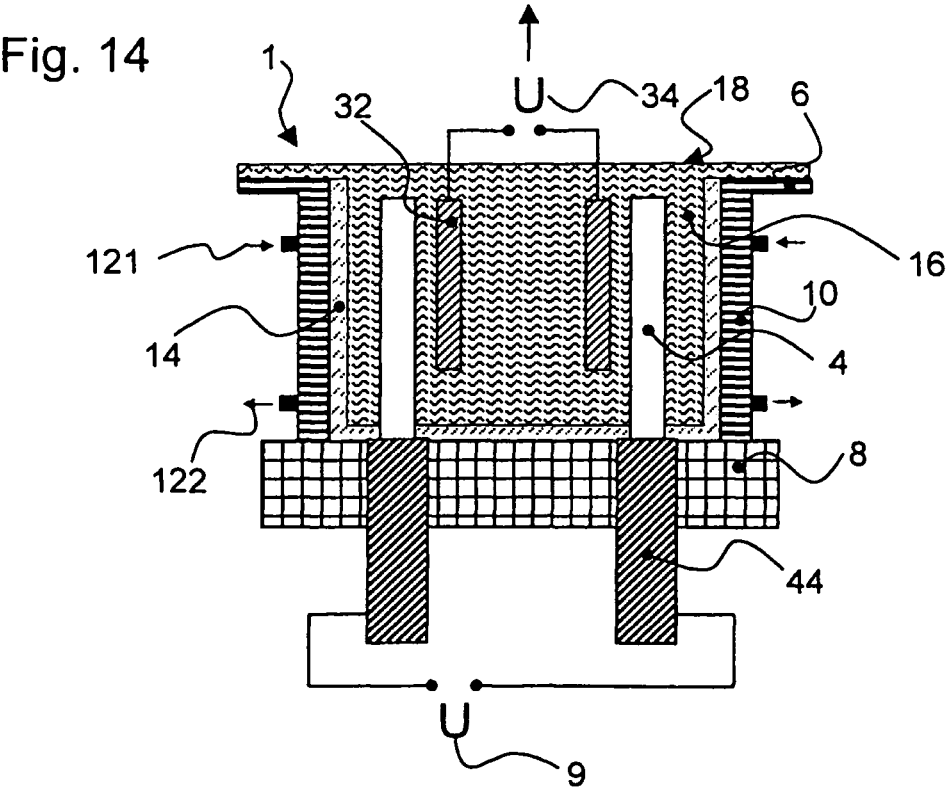
Figure 15:
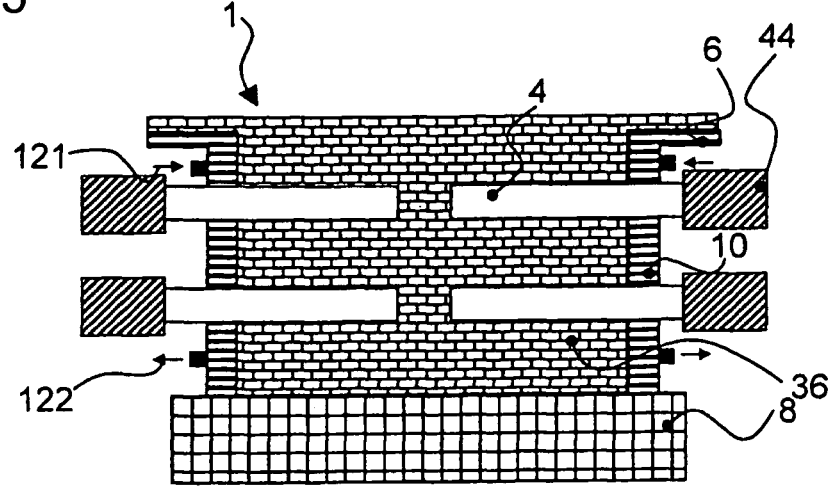
Figure 16:
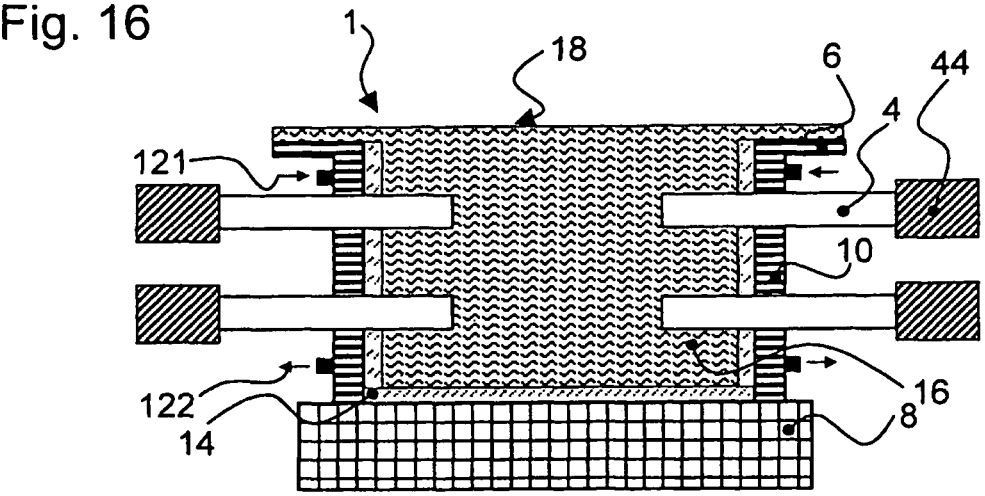
Figure 17:
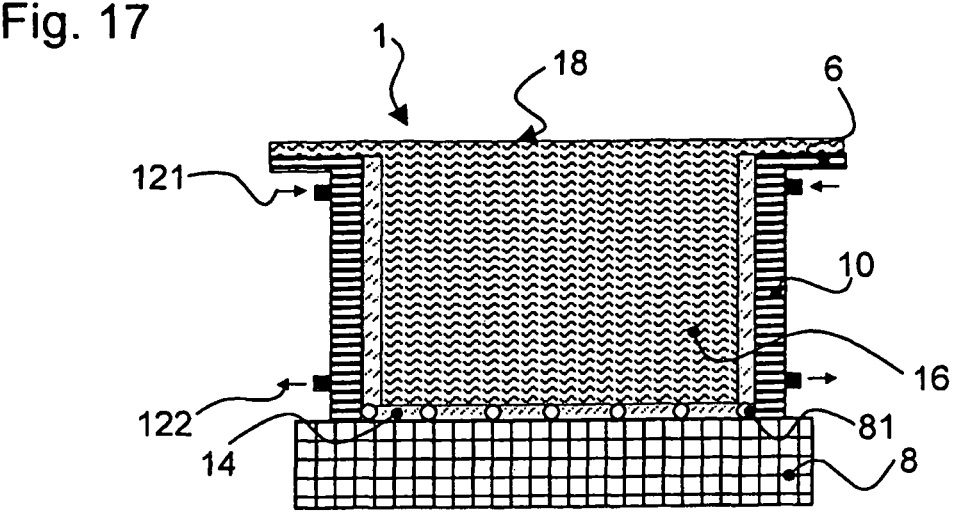
Figure 18:
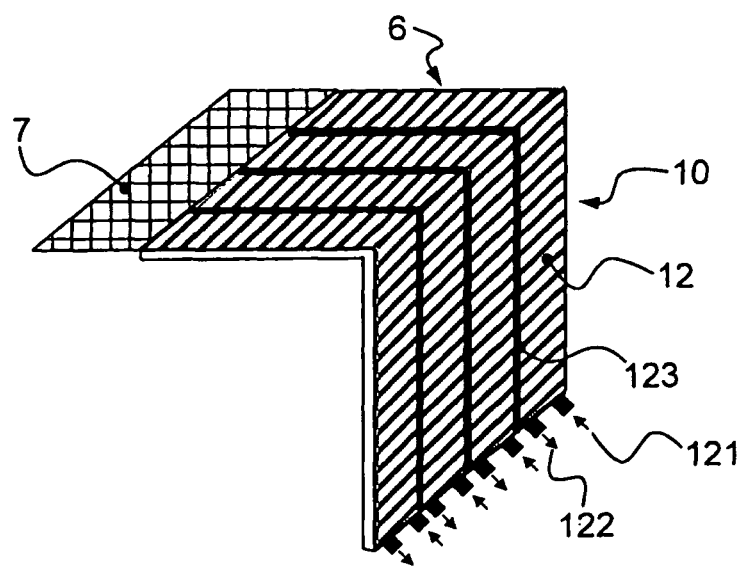

It is shown:

FIG. 1 a schematic illustration of different electrodes,

FIG. 2 a schematic illustration of two coolable electrodes in cross-section, FIG. 3 a schematic illustration of different segmented electrodes, in cross-section each, FIG. 4 a schematic illustration of an electrode, which is movable with respect to the vessel wall or the vessel bottom respectively, FIG. 5 a schematic illustration of the device according to the invention in top view, FIG. 6 a schematic illustration of the device according to the invention in cross-section, in a section line perpendicular to the flow-through direction of the melt through the vessel in totally emptied condition, FIG. 7 a schematic illustration of the device according to the invention in cross-section, in a section plane perpendicular to the flow-through direction of the melt through the vessel with skull crust, FIG. 8 a schematic illustration of the device according to the invention in cross-section, in an section plane perpendicular to the flow-through direction of the melt through the vessel in filled condition, FIG. 9 a schematic illustration of the device according to the invention in cross-section, in an section plane parallel to the flow-through direction of the melt through the vessel during operation with additional heating, FIG. 10 detailed illustration of the convection roller in the flow during operation according to an arrangement as depicted in FIG. 9, FIG. 11 a schematic illustration of the device according to the invention, according to a further embodiment in cross-section, in a section plane parallel to the flow-through direction of the melt through the vessel, with fixtures influencing the flow of the melt, FIG. 12 a schematic illustration of the device according to the invention in cross-section, in a section plane parallel to the flow-through direction of the melt according to a further embodiment, with additional heating, and fixtures influencing the flow of the melt, FIG. 13 a schematic illustration of the device according to the invention, according to a further embodiment in cross-section, in a section plane perpendicular to the flow-through direction of the melt through the vessel in operation mode during the beginning of the starting process, FIG. 14 arrangement as in FIG. 13 in operation mode, when finishing the starting process, FIG. 15 a schematic illustration of the device according to the invention, according to a further embodiment in cross-section, in a section plane perpendicular to the flow-through direction of the melt through the vessel in operation mode during the starting process, FIG. 16 arrangement as in FIG. 13 in operation mode after finishing the starting process, FIG. 17 a schematic illustration of the device according to the invention, according to a further embodiment in cross-section, in a section plane perpendicular to the flow-through direction of the melt through the vessel for illustrating the cooling of the vessel bottom, FIG. 18 a schematic illustration of a section of the skull pot of the device according to the invention in perspective view.

For the arrangement in the inner of the vessel according to the device according to the invention, rod electrodes or plate electrodes may be used inter alia. In FIG. 1, an exemplary selection of such electrodes 4 is shown. Rod electrodes may have a round (FIG. 1A), a rectangular (FIG. 1B), or a multi-angular (FIG. 1C) cross section. Also plate electrodes can be varied in their geometry. For example, at the time when a flow influencing effect is wanted, a profile fitted to the flow may be selected (FIG. 1D). Likewise, using simple plate electrodes with a block shaped geometry is possible (FIG. 1E). For influencing the flow, very different forms may be selected, as also an electrode with a curved cross-section, for example (FIG. 1F).

Not depending on, which form and geometry was selected for the electrode 4, the electrodes may have openings 41 in their inner, through which openings a fluid for cooling the electrode 4 may be piped. In FIG. 2, example of such electrodes 4 are shown. According to FIG. 2, a simple boring in the melt contact material 42 of the electrode 4 can be chosen as opening for a cooling fluid. By means of a fluid channel 41, FIG. 2 shows a further possibility for providing an opening for the cooling fluid.

As depicted in FIG. 3, the design of the electrodes 4 can be varied further. In cross-section, FIG. 3 shows an electrode 4 with a core 43, which may consist of ceramics for example. The core 43 is provided with a layer from ceramics for example. Furthermore, the electrodes may have a segmented design for purposefully controlling the current, and therewith for example for influencing the convection roller. FIGS. 3B, 3C, and 3D show such arrangements, wherein the electrode 4 has a core 4, which for example may consist of ceramics, and segments, onto which the melt contact material 42 is superimposed.

Especially for the mounting through the vessel bottom, but for the mounting through the side walls 10 of the vessel also, the electrodes 4 may be designed movable. Such an electrode arrangement is depicted in FIG. 4. The electrode 4 is accepted by an electrode holder 44, which has an inner thread 49, into which the electrode 4 may be screwed. Also other possibilities for mounting the electrode 4 in the electrode holder 44 are imaginable. The electrode holder 44 is designed to be coolable, and has a cooling medium supply 46 as well as a cooling medium outlet 47.

The electrode holder 4, and with it the electrode 4 are connected with an exemplarily hydraulic moving means 45. In an inserted into a wall or into the bottom of the vessel condition, the electrode 4 protrudes into the interior of the vessel, while the electrode holder 44 is in the region of the vessel wall 10 or of the bottom 8, and the moving means 45 is positioned on the far side of the vessel wall or the of the bottom. By means of the moving means 45, the vertical position of the electrode 4 may be adjusted with respect to the vessel bottom or the length of the electrode 4 protruding into the interior of the vessel at any wanted point of time in the case of the arrangement in the vessel wall.

In the illustrations A to D of FIG. 5, a top view of the vessel with various electrodes arranged therein is shown. In FIG. 5E, an arrangement is depicted, which has additionally further flow influencing fixtures 30. FIG. 5A shows two electrodes 4, which are arranged side by side in two rows. The rows are parallel to the flow-trough direction of the melt, directed from the supply 20 through the vessel 2 to the outlet 22. Supply and outlet of the side walls 10 of the vessel 2 are designed angled such that the bent part is directed away from the vessel 2, forming a collar by doing so. Subsequent to the collar, the surrounding of the device is also depicted in FIG. 5A for orientation.

In FIG. 5B, a further embodiment of the device is shown with electrodes 4, which are arranged in two rows relatively to the collar 6 of the vessel 2, wherein the rows extend perpendicularly to the flow direction through the vessel 2. As depicted in FIG. 5C, further electrodes 4 may be distributed in the interior of the vessel, so that for example, an arrangement may be implemented, which affects the material to be melted as static mixer. The electrodes 4 may also purposefully influence the flow of the melt through the vessel 2 by means of a special design.

As shown in FIG. 5D, a ring segment can be made from electrodes 4 with curved cross-section. Such electrodes 4 with curved cross-section, however, can also be used, as shown in FIG. 5E, in combination with other electrodes, here with rod electrodes with a round cross-section. Additionally to the electrodes 4, the flow influencing fixtures 30 can arranged in the vessel 2.

FIG. 6 shows the device according to the invention in a totally emptied condition. On the bottom 8 of the vessel 2, the wall 10 is attached, by what a skull pot is formed. Through the bottom 8, electrode holders 44 and electrodes 4 connected thereto are inserted such that the electrodes 4 are arranged in the interior of the vessel. The wall of the vessel are angled L-shaped, by what a collar 6 is formed. The electrodes 4 are in contact with the power supply 9 via the electrode holders 44.

If the device according to the invention is operated as skull pot as provided, a skull crust is formed. An arrangement of the device with this skull crust 14 is shown in FIG. 7. in the device 1 for temperature manipulation of a melt, a skull crust is formed in the interior at the vessel wall 10, namely a layer of solidified melt 14, because the vessel wall 10 is cooled so intensely that the melt material from the interior of the vessel solidifies at the wall 10. Cooling the vessel wall can be done by conveying cooling media through the pipes of the skull pot. So, the device 1 has corresponding stubs for the cooling medium supply 121 of the cooling medium outlet 122 respectively. As shown in FIG. 8, when operating the device 1 according to the invention, the melt 16 is not in contact with the vessel wall 10 of the skull pot, because the solidified melt 14 is formed as skull crust in-between.

Above the surface of the molten pool 18, there is the superstructure region of the furnace 26. In order to reduce or rather to avoid annealing of the melt 16 at the molten pool surface 18, it may make sense to operate the device 1 with an additional heating. According to the embodiment depicted in FIG. 9, for that purpose an arrangement of gas burners 24 is provided, which may arranged for example in a supporting frame so that superstructure region of the furnace 26 may be heated by means of gas burners 24.

In FIG. 10, the then appearing convention roller 28 is shown in detail. The melt material enters the vessel 2 via the supply 20. Due to the cooling of the wall of the skull pot 10, the melt solidifies as the skull crust 14. After passing the supply, the entering melt material hits a very cool region, when leaving the supply, and precipitates downwards into the interior of the vessel 2. In the interior of the vessel, the heating takes place by means of the ohmic resistance heating by the electrodes not depicted in FIG. 10. The melt 16 heats up, and therefore rises upwards in the vessel. If the temperature distribution in the vessel 2 was adjusted accordingly, the convention roller works stationarily. Fluid elements heated up to especially high temperatures leave the vessel 2 via the outlet 22, which is provided with larger length in comparison to the supply 20 in order to be able to serve as cooling section.

For adjusting the temperature distribution as well as the residence time distribution in the interior of the vessel 2 by adjusting the flow profile, flow influencing fixtures 30 can be arranged in the interior of the vessel 2. The simplified illustration in FIG. 11 shows the possibility for such an arrangement, where depicting the electrodes has been omitted for clarity reasons.

FIG. 12 shows another embodiment of the device 1, which here is operated with an additional heating in the superstructure region of the furnace 26 by means of gas burners 24, which are arranged in a supporting frame 25, wherein the supporting frame also serves as flow influencing fixtures 30, which are dipped into the melt from above. Additionally, flow influencing fixtures 30 may also be provided at the side walls 10 of the vessel 2.

For starting the device 1, start electrodes 32 may be used. In FIG. 13 an embodiment of the device 1 is depicted during the starting process. Start electrodes 32 are inserted into the still solid melt material 36, and arranged in a small distance to each other. They have a power supply 34. A region of melted melt material 16 is formed between the start electrodes 32. During the start process, the start electrodes, as indicated in FIG. 13 by means of arrows, are pulled apart from each other. The start electrodes may also be heated for facilitating the start process.

FIG. 14 shows the start process in a later state, in which the start electrodes are already pulled apart from each other, and the melt material is fluidified. Now, the start electrodes 32 may again be removed, as indicated by the arrow pointing upwards. During the start process, an increasing amount of the initially still solid melt material 36 melts, and the electrodes 4 may be pulled apart from each other to ever increasing distances. An according situation is shown in FIG. 16.

In order to protect the bottom 8 of the skull pot against high temperature impact and corrosion, the pot is cooled in the device 1 according to the invention.

In the simplified illustration of the device 1 of FIG. 17, the cooling of the vessel bottom by means of pipes 81 bearing on the bottom plate 8 is shown. Accordingly, the skull crust is formed around the pipes 81 or can accumulate into the interior of the vessel such that the cooling pipes 81 on the vessel bottom are covered by the skull crust 14.

A section of a skull pot made from segments is shown in FIG. 18. Following the surrounding 7, modules arranged to one another are provided. The modules consist of pipes 12, wherein several pipes 12 together are connected to a wall element, which is characterized by the already introduced cross-hachure of the wall 10. The pipes 12 themselves are in connection with the cooling medium supply 121 and the cooling medium outlet 122 of one element of the wall 10. An insulation is inserted between the modules, in order to stop electrical contact between the wall elements particularly made from metal pipes.

Because especially high temperatures of the melt may be achieved with the device according to the invention by means of electrodes in the interior of a skull pot, the invention makes melting and/or refining and/or purifying of glasses possible, which are difficult to treat such as a display glass. For treating the display glass, the device may particularly be operated such that the mean retention time is not below a certain value. Herefrom, corresponding ratios of the values of the vessel volume and the through-put result. In this context, particularly the glass type depending viscosity and the volume expansion coefficient are crucial, too.

List of Reference Signs
1 Device for temperature manipulation of a melt
2 Vessel
4 Electrode
   41 Fluid channel
   42 Melt contact material
   43 Core
   44 Electrode holder
   45 Hydraulic moving means
   46 Cooling medium supply
   47 Cooling medium outlet
   48 Thread
   49 Threaded hole
6 Vessel collar
7 Vessel surrounding area
8 Vessel bottom
   81 Cooling of the vessel bottom
9 Power supply for electrodes
10 Vessel wall
12 Tubes of the skull pot
   121 Cooling medium supply
   122 Cooling medium outlet
   123 Isolation of the skull elements
14 Solidified melt
16 Melt
18 Molten pool surface
20 Supply
22 Outlet
24 Gas burner
25 Supporting frame for heating means
26 Superstructure region of furnace
28 Convection roller
39 Flow manipulating fixtures
32 Start electrodes
34 Power supply for start electrodes
36 Melt material

What is claimed is:
1. A method of refining a glass melt in the interior of a vessel formed by a bottom wall and side walls which comprise metallic components, the method comprising:
   a) providing molten glass in the interior of the vessel up to a molten glass surface;

b) providing at least one pair of electrodes in the interior of the vessel in a distance of at least 1 cm from the metallic components and without direct contact with cooled bounding surfaces of the vessel;

c) powering the at least one pair of electrodes to produce electrical current therebetween and to heat the molten glass by ohmic resistance heating up to at least 1700° C. in at least a restricted region between the electrodes, with the electrodes being used within a hot region of the glass melt;

d) cooling the bottom wall and the side walls adjacent to the metallic components so as to cool the glass melt near the metallic components, such that all of the side walls are separated from the glass melt by a skull layer consisting of solidified material of the melt during operation, with the skull layer being isolated against ground and the electrodes; and e) producing a convective flow of molten glass in the interior of the vessel, driven by a temperature difference of the molten glass near the electrodes and near the cooled walls so as to make molten glass flow along the molten glass surface and help gas bubbles to escape through the molten glass surface by the electrodes all being arranged in the interior of the vessel and causing heating of the melt forming an upward flow of the melt between the electrodes in the vessel.

2. The method of claim 1 wherein the step a) of providing molten glass also includes adding a refining agent into the glass.

3. The method of claim 2 wherein the refining agent comprises $SnO_2$.

4. The method of claim 1 wherein the step a) of providing molten glass also includes heating glass from above the molten glass surface.

5. The method of claim 1 wherein the step a) of providing molten glass also includes heating glass by start electrodes that are immersed into the glass through the molten glass surface.

6. The method of claim 5 wherein the start electrodes, when just being immersed, take a short distance from one another, and are removed from one another in correspondence with increase of temperature in the glass melt.

7. The method of claim 1 wherein the step b) of providing at least one pair of electrodes includes a plurality of electrodes formed and arranged in a pattern to assist convective flow of molten glass.

8. The method of claim 7 wherein the flow of molten glass is influenced by vane surface fixtures arranged in the flow of molten glass.

9. The method of claim 1 wherein the step c) of powering is carried out in a controlled manner so as to reduce voltage at the electrodes with increasing temperature in the glass melt.

10. The method of claim 9 wherein temperature in the glass melt is controlled to adjust electrical conductivity of the glass melt in a range from $10^{-2}$ to $10^1$ $\Omega^{-1} \cdot cm^{-1}$.

11. The method of claim 1 wherein the step c) of powering is carried out with electrodes comprising iridium to reach a temperature in the glass melt in the range of between 1700 and 2000° C.

12. An apparatus for refining a glass melt comprising:

a vessel having a bottom wall and side walls defining an inner chamber, at least the side walls including metallic components;

at least one pair of electrodes arranged in the chamber for ohmic resistance heating of the glass melt within a hot region of material to be melted with all electrodes being arranged in the interior of the vessel and having a distance of at least 1 cm from the metallic components and without direct contact with cooled bounding surfaces of the vessel, each of the electrodes being of a kind to sustain a high temperature in the range of between 1700 to 2000° C. in the glass melt, and having a distance to the metallic components in the side walls so as to allow convective glass flow between the side walls and the electrodes when the glass melt is heated up;

a power supply for powering the electrodes; and cooling circuits for cooling the bottom wall and the side walls adjacent to the metallic components so as i) to produce a glass crust consisting of solidified material of the melt covering the metallic components such that all of the side walls are separated from the glass melt by a skull layer and ii) to drive the convective glass flow by a temperature difference of molten glass near the cooled walls and in a region between the electrodes, with the glass crust being isolated against ground and the electrodes.

13. The apparatus of claim 12 wherein the bottom wall of the chamber has each a recess for passing through each of the electrodes into the chamber.

14. The apparatus of claim 13 wherein each of the electrodes has an electrode holder, each electrode holder being placed in a respective recess of the bottom wall.

15. The apparatus of claim 14 wherein each electrode holder is cooled.

16. The apparatus of claim 12 wherein the side walls comprise opposed side walls which include openings, each opening provided for passing through a respective electrode.

17. The apparatus of claim 12 wherein a plurality of electrodes and vane surface fixtures are arranged in the chamber to assist convective flow of molten glass along the bottom and side walls cooled.

* * * * *